Figure 1:
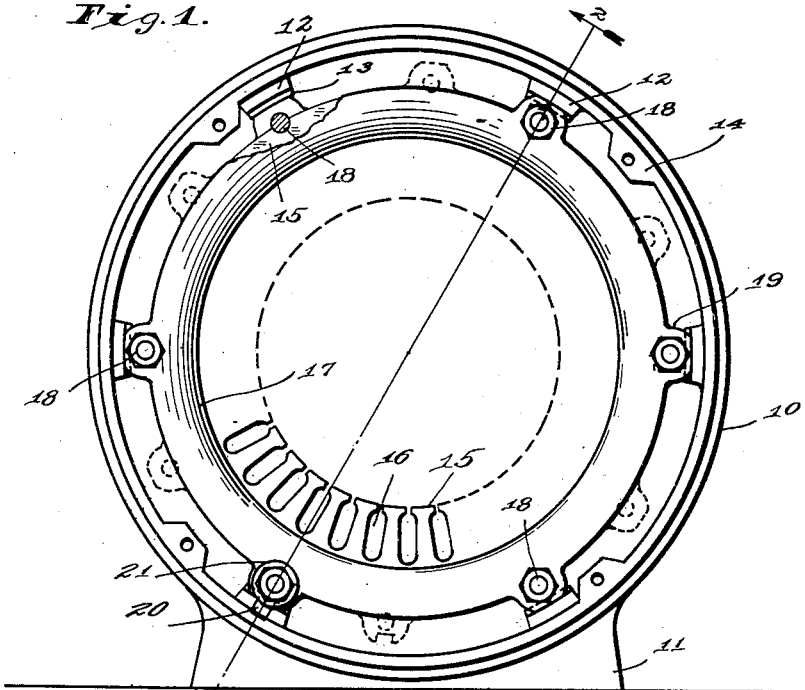

W. A. AND F. W. MARSCHKE.
STATOR.
APPLICATION FILED APR. 7, 1919.

1,403,179.

Patented Jan. 10, 1922.

Witness
Frank A. Fahle

Inventors
William A. Marschke
Fredrich W. Marschke
By Hood & Schley
Attorneys

UNITED STATES PATENT OFFICE.

WILLIAM A. MARSCHKE AND FREDRICH W. MARSCHKE, OF INDIANAPOLIS, INDIANA, ASSIGNORS TO MARSCHKE MANUFACTURING COMPANY, OF INDIANAPOLIS, INDIANA, A CORPORATION OF INDIANA.

STATOR.

1,403,179.  Specification of Letters Patent.  Patented Jan. 10, 1922.

Application filed April 7, 1919. Serial No. 287,941.

*To all whom it may concern:*

Be it known that we, WILLIAM A. MARSCHKE and FREDRICH W. MARSCHKE, citizens of the United States, residing at Indianapolis, in the county of Marion and State of Indiana, have invented a new and useful Stator, of which the following is a specification.

It is the object of our invention to provide a stator construction for electric motors, wherein the whole stator magnetic unit may be removed as a unit from an outside frame in which it is supported. This has many advantages, both in the original construction and in repairing. For instance, it permits the removal and replacement of the stator magnetic unit in case anything happens to it, or the substitution of another stator unit therefor, without interfering with the mounting of the main frame of the motor, and without marring the finish of such main frame or requiring a new motor with a differently finished frame to be substituted for it.

The accompanying drawing illustrates our invention. In such drawing, Fig. 1 is an end elevation of a stator embodying our invention; and Fig. 2 is a section on the line 2—2 of Fig. 1.

The stator frame 10, usually provided with supporting legs 11, is generally annular in shape, and from its inside surfaces a series of lugs 12 project radially inward. These lugs are provided with rabbets 13 at their axial ends. These lugs 12 are for the support of the removable stator magnetic unit. In addition, the frame 10 near its axial ends has lugs 14 for the attachment of the bearing supports for the rotor; but as this forms no part of the present invention, the lugs 14 and their associated parts need not be further referred to.

The removable stator magnetic unit comprises a group of laminæ 15, having suitable slots 16 or other coil-receiving parts, which laminæ are clamped between two end rings 17 held together by bolts 18. The laminæ 15 are centered by having their outer edges abut against the bolts 18, and are held from turning by being provided with one or more peripheral notches in which one or more of the bolts 18 lie. The clamping rings 17 have outwardly projecting lugs 19 which are spaced around their peripheries to correspond with the lugs 12 on the frame 10, with which the lugs 19 co-operate. These lugs 19 project into the rabbets at the axial ends of the lugs 12, so that the center part of such lugs 12 between the end rabbets may be clamped between the lugs 19 when the bolts 18 are tightened. The lugs 19 fit rather closely in the rabbets 13, so as to center the removable magnetic unit.

Figure 2:
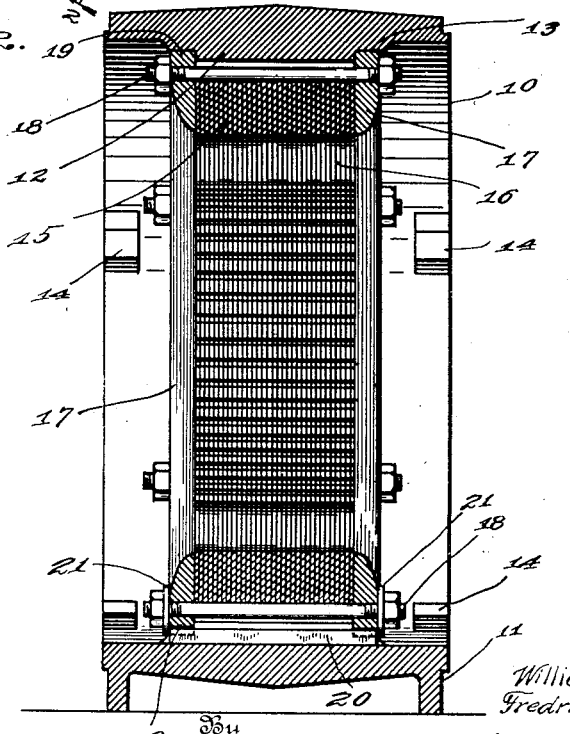

The removable magnetic unit, comprising the end rings 17, the laminæ 15 and its windings, and the bolts 18, is placed in the frame 10 with the lugs 19 out of registry with the lugs 12, as shown in dotted lines in Fig. 1; and is then turned to bring the lugs 19 into registry with the lugs 12 and so that the central parts of the lugs 12 will lie between the lugs 19, as shown in full lines in Fig. 1. During this time, the bolts 18 are slightly loosened, but when the magnetic unit has been turned to its place these bolts are tightened to clamp it there and also to clamp the laminæ 15 firmly.

In order to hold the removable magnetic unit against possibility of turning a key 20 is placed in suitable key-ways in one of the lugs 12 and its abutting lugs 19; and such key is held in place longitudinally by washers 21 mounted on the adjacent bolt 18 and overlapping the ends of the key.

In case anything happens to this stator, such as having its windings burn out, the magnetic unit may be removed by simply loosening the bolts 18 and removing the key 20; and a new magnetic unit may be substituted therefor. This can be done without disturbing the outer frame 10, or marring its finish; so that by such a substitution there is no need of disturbing the interrelation or the similarity of finish of the frame 10 and its associated machine.

We claim as our invention:

1. A stator, comprising the combination of a stator frame; and a removable stator magnetic unit removable as a unit and comprising laminæ, clamping end rings, and bolts and nuts for drawing the end rings together to clamp the laminæ between them, the outer edges of said laminæ abutting against said bolts so as to be centered thereby and being provided with a peripheral notch in which one of said clamping bolts lies to prevent turning of the laminæ, said end rings being provided with means for removable attachment to said stator frame while the nuts remain on the bolts.

2. A stator, comprising the combination of a stator frame; and a removable stator magnetic unit removable as a unit and comprising laminæ, clamping end rings, and bolts and nuts for drawing the end rings together to clamp the laminæ between them, said bolts passing between the end rings outside of the laminæ, the outer edges of said laminæ being provided with a peripheral notch in which one of said clamping bolts lies to prevent turning of the laminæ, said end rings being provided with means for removable attachment to said stator frame while the nuts remain on the bolts.

3. A stator, comprising the combination of a stator frame; and a removable stator magnetic unit removable as a unit and comprising laminæ, clamping end rings, and bolts and nuts for drawing the end rings together to clamp the laminæ between them, the outer edges of said laminæ abutting against said bolts so as to be centered thereby, said end rings being provided with means for removable attachment to said stator frame while the nuts remain on the bolts.

4. A stator, comprising the combination of a stator frame; and a removable stator magnetic unit removable as a unit and comprising laminæ, clamping end rings over-lapping the stator frame, and bolts for drawing the end rings together to clamp the laminæ and the stator frame between them.

5. A stator, comprising the combination of a stator frame having inwardly projecting lugs; and a removable stator magnetic unit removable as a unit and comprising laminæ, clamping end rings, and bolts for drawing the end rings together to clamp the laminæ between them, the outer edges of said laminæ abutting against said bolts so as to be centered thereby, said end rings being provided with outwardly projecting lugs for detachable co-operation with the inwardly projecting lugs from the frame, and said lugs being arranged so that by their interengagement they center the magnetic unit.

6. A stator, comprising the combination of a stator frame having inwardly projecting lugs; and a removable stator magnetic unit removable as a unit and comprising laminæ, clamping end rings, and bolts for drawing the end rings together to clamp the laminæ between them, said end rings being provided with outwardly projecting lugs for detachable co-operation with the inwardly projecting lugs from the frame.

7. A stator, comprising the combination of a stator frame having inwardly projecting lugs; and a removable stator magnetic unit comprising laminæ, clamping end rings, and bolts for drawing the end rings together to clamp the laminæ between them, said end rings being provided with outwardly projecting lugs for detachable co-operation with the inwardly projecting lugs from the frame, and said inwardly projecting lugs being provided with rabbets at their axial ends into which the outwardly projecting lugs fit so that by the clamping of the clamping bolts the center parts of the inwardly projecting lugs are clamped between the lugs on the clamping rings.

8. A stator, comprising the combination of a stator frame having inwardly projecting lugs; and a removable stator magnetic unit comprising laminæ, clamping end rings, and bolts for drawing the end rings together to clamp the laminæ between them, said end rings being provided with outwardly projecting lugs for detachable co-operation with the inwardly projecting lugs from the frame, a key co-operating with a set of inwardly and outwardly projecting lugs to prevent relative turning between the frame and the removable unit, and washers on the end of an adjacent clamping bolt for holding said key in place.

9. A stator, comprising the combination of a stator frame having inwardly projecting lugs; and a removable stator magnetic unit comprising laminæ, clamping end rings, and bolts for drawing the end rings together to clamp the laminæ between them, said end rings being provided with outwardly projecting lugs for detachable co-operation with the inwardly projecting lugs from the frame, and a key co-operating with a set of inwardly and outwardly projecting lugs to prevent relative turning between the frame and the removable unit.

10. A stator, comprising the combination of a stator frame having a plurality of spaced inwardly projecting lugs, and a removable stator magnetic unit removable as a unit and having a plurality of similarly spaced outwardly projecting lugs arranged in two sets, said inwardly projecting lugs and said outwardly projecting lugs being arranged so that they may be separated or interlockingly associated with the former between the two sets of the latter by relative rotation of said frame and removable unit.

11. A stator, comprising the combination of a stator frame having a plurality of spaced inwardly projecting lugs, a removable stator magnetic unit removable as a unit and having a plurality of similarly spaced outwardly projecting lugs arranged in two sets, said inwardly projecting lugs and said outwardly projecting lugs being arranged so that they may be separated or interlockingly associated with the former between the two sets of the latter by relative rotation of said frame and removable unit, and means for locking said frame and removable unit against relative rotation when said two sets of lugs are interlockingly associated.

12. A stator, comprising the combination of a stator frame having inwardly projecting lugs; and a removable stator magnetic unit removable as a unit and comprising laminæ, clamping end rings provided with outwardly projecting lugs overlappingly cooperable with the inwardly projecting lugs from the frame, and bolts for drawing the nd rings together to clamp the laminæ between them and the inwardly projecting lugs between the outwardly projecting lugs.

In witness whereof we have hereunto set our hands at Indianapolis, Indiana, this fourth day of April, A. D. one thousand nine hundred and nineteen.

WILLIAM A. MARSCHKE.
FREDRICH W. MARSCHKE.